United States Patent
Niculescu et al.

(10) Patent No.: US 10,488,063 B2
(45) Date of Patent: Nov. 26, 2019

(54) CONTROL DEVICE WITH BULK HEATING COMPENSATION

(71) Applicant: ECOBEE INC., Toronto (CA)

(72) Inventors: Cristian Sebastian Niculescu, Toronto (CA); John Theodore Metselaar, Paris (CA)

(73) Assignee: ECOBEE INC., Toronto (CA)

( * ) Notice: Subject to any disclaimer, the term of this patent is extended or adjusted under 35 U.S.C. 154(b) by 0 days.

(21) Appl. No.: 15/878,977

(22) Filed: Jan. 24, 2018

(65) Prior Publication Data

US 2018/0149381 A1   May 31, 2018

Related U.S. Application Data

(63) Continuation of application No. 15/292,648, filed on Oct. 13, 2016, now Pat. No. 10,215,432.

(51) Int. Cl.
*F24F 11/30* (2018.01)
*H02H 3/093* (2006.01)
(Continued)

(52) U.S. Cl.
CPC .............. *F24F 11/30* (2018.01); *F24F 11/46* (2018.01); *F24F 11/52* (2018.01); *H02H 3/093* (2013.01);
(Continued)

(58) Field of Classification Search
CPC .. F24F 11/30; F24F 11/46; F24F 11/52; F24F 11/64; F24F 2110/10; F24F 2140/50; G05B 19/048; G05B 2219/2614; H02H 3/093
See application file for complete search history.

(56) References Cited

U.S. PATENT DOCUMENTS

| 5,467,920 A * | 11/1995 | Porter ................ G05D 23/2754 236/10 |
| 2013/0018513 A1* | 1/2013 | Metselaar .......... G05D 23/1902 700/278 |

(Continued)

OTHER PUBLICATIONS

USPTO, Non-Final Rejection, dated Jun. 21, 2018, re U.S. Appl. No. 15/292,648.

*Primary Examiner* — Yuhui R Pan
(74) *Attorney, Agent, or Firm* — Perry + Currier Inc.

(57) ABSTRACT

A control device, such as a smart thermostat, employs solid state relays as switches to activate and deactivate systems controlled by the device. Current flows through at least some of the solid state relays are monitored to determine the bulk heating produced in the solid state relays, and their associated circuitry and printed circuit board traces, and this determined amount of bulk heat is added to other determined amounts of bulk heat and is used to compensate the reading provided by temperature sensors within the control device which have been affected by the bulk heat. Further, by measuring the current flow through the power buses to one or more of the solid state relays of the control device, potentially damaging over current conditions can be distinguished from permissible transient over-current conditions and the control device can deactivate any solid state relays which would be damaged while allowing solid state relays which are experiencing allowable transients to remain operating. In the case of a severe over current condition, a current monitoring device can issue a fault signal, triggering an interrupt condition which will cause a processor in the controller to shut down the affected solid state relays very quickly.

7 Claims, 5 Drawing Sheets

(51) Int. Cl.
*F24F 11/46* (2018.01)
*F24F 11/52* (2018.01)
*H02H 7/22* (2006.01)
*F24F 140/50* (2018.01)
*F24F 110/10* (2018.01)
*G05B 19/048* (2006.01)
*F24F 11/64* (2018.01)
*H02H 6/00* (2006.01)
*G05B 19/042* (2006.01)

(52) U.S. Cl.
CPC .............. *H02H 7/222* (2013.01); *F24F 11/64* (2018.01); *F24F 2110/10* (2018.01); *F24F 2140/50* (2018.01); *G05B 19/048* (2013.01); *G05B 19/0428* (2013.01); *G05B 2219/2614* (2013.01); *H02H 6/00* (2013.01)

(56) References Cited

U.S. PATENT DOCUMENTS

| | | | |
|---|---|---|---|
| 2013/0234779 A1* | 9/2013 | Klug, Jr. .......... | H03K 17/04123 327/432 |
| 2016/0195294 A1* | 7/2016 | Conner ................. | G01R 31/00 236/1 C |

* cited by examiner

CONTROL DEVICE WITH BULK HEATING COMPENSATION

CROSS REFERENCE TO RELATED APPLICATIONS

This application is a Continuation Application of, and claims priority to, U.S. patent application Ser. No. 15/292,648, entitled "Control Device with Current Protected Solid State Relays", filed Oct. 13, 2016, the entirety of which is incorporated by reference herein for all purposes.

FIELD OF THE INVENTION

The present invention relates to a control device. More specifically, the present invention relates to a control device, such as an environmental control device for HVAC systems or the like, where the control device employs solid state relays to activate and deactivate sub-systems controlled by the device.

BACKGROUND OF THE INVENTION

Control devices exist for many, many systems. A common control device that most people are familiar with is an environmental control device such as an HVAC thermostat which can control of variety of environmental factors (heating, cooling, humidity, ventilation, etc.) in their homes or at other locations. While thermostats have been used for many years, such control devices have until relatively recently been simple analog/mechanical devices employing sensors such as bimetallic strips, etc. combined with mercury tilt switches which directly activate, or deactivate, relays, contactors or other HVAC control devices.

Smart thermostats have now been developed which employ digital processors executing potentially complex software programs to better control environmental factors. These smart thermostats are typically equipped with a variety of sensors (solid state temperature and humidity sensors, etc.) and other information (from remote sensors providing occupancy information and/or remote temperatures, etc. and/or from network-connected servers providing weather conditions and forecasts, etc) which provide inputs to the executing software to control the respective HVAC systems. Such smart thermostats are becoming increasingly popular, both because they typically allow remote control and monitoring (typically via Internet applications) of the operation of the smart thermostat and conditions within the controlled environment, but also because they provide increased user comfort and/or reduce HVAC system energy usage. Examples of such smart thermostats include the Ecobee$_3$ controller manufactured by Ecobee, 250 University Avenue, Suite 400 Toronto, ON, Canada, M5H 3E5.

While such smart thermostats are significant improvements over prior thermostats, their design, manufacture and operation pose some unique challenges. For example, HVAC control systems typically require the switching of significant amounts of electrical power to activate air conditioning compressors, circulating fans, etc. While prior art analog/mechanical thermostats could typically handle significant levels of electric power, including various exceptional conditions (faults), in contrast digital control devices are much more susceptible to spikes, over voltages, etc. and yet are expected to provide reliable service for many trouble free years. Further, while the advantages of smart thermostats are obvious, consumer behaviors still require that a smart thermostat be affordable, reasonably small in size and, above all, reliable. Meeting all of these criteria is a difficult task.

SUMMARY OF THE INVENTION

It is an object of the present invention to provide a novel control device which obviates or mitigates at least one disadvantage of the prior art.

According to a first aspect of the present invention, there is provided a control device for controlling one or more electrical subsystems in accordance with a control program, comprising: a housing; a memory storing an operating program; at least one environmental sensor within the housing to determine the temperature within the housing; at least one solid state relay operable, when activated, to connect at least one electrical subsystem to a supply of power and further operable, when deactivated, to disconnect the at least one electrical subsystem from the supply of power; at least one current measuring device to determine the amount of current flowing from the supply of power to the at least one electrical subsystem when the at least one solid state relay is activated; and a processor operable to execute the operating program to: determine the amount of bulk heating produced by the determined amount of current and an associated predetermined electrical resistance; sum the determined amount of bulk heating with the amount of bulk heating produced in the housing by other components to obtain a determined sum of the bulk heating in the housing; compensate the determined temperature value by an amount corresponding to the determined sum of the bulk heating in the housing to obtain a compensated determined temperature value; and to activate and deactivate the at least one solid state relay to activate and deactivate the at least one electrical subsystem as needed to maintain the compensated determined temperature value within a preselected range of desired temperature values.

According to another aspect of the present invention, there is provided a method of controlling, with a control device, a HVAC system comprising at least two subsystems: measuring, with a temperature sensor located with a housing of the control device, a temperature; determining the sum of the bulk heating created by components and power flows within the housing, comprising the steps of: (a) measuring the current flowing through at least one solid state relay to at least one of the at least two HVAC subsystems; (b) determining a bulk heating value corresponding to the measured current flow; (c) determining a bulk heating value corresponding to bulk heating created by other components within the housing; (d) summing all determined bulk heating values to obtain a total bulk heating value; (e) compensating the measured temperature to correct for the determined total bulk heating value to obtain a compensated temperature value; comparing the compensated temperature value to a preselected range of temperature values; and activating and deactivating the at least one solid state relay to activate and deactivate the at least one HVAC subsystem as needed to maintain the compensated temperature value within the preselected range of temperature values.

According to another aspect of the present invention, there is provided a method of protecting at least one solid state relay connected between a load and a power bus within a control device from potentially damaging over current conditions, comprising the steps of: (a) determining a set of at least three safety thresholds, each threshold comprising a maximum current flow level and a maximum permitted time therefore, the thresholds being defined according to the safe power dissipation capacity of the solid state relay; (b) measuring a current flow through the solid state relay; (c) comparing that measured current flow to each of the at least three safety thresholds; (d) determining if the measured current flow exceeds the maximum current flow level of at least one of the at least three safety thresholds; (e) if the measured current flow exceed the maximum current flow level of the at least one of the at least three safety thresholds, determining if the current flow has occurred for a period exceeding the maximum permitted time defined for that threshold and shutting down each of the at least one solid state relays if the maximum permitted time threshold has been exceeded; (f) repeating step (e) for each of the at least three safety thresholds; and (g) repeating steps (b) through (f).

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
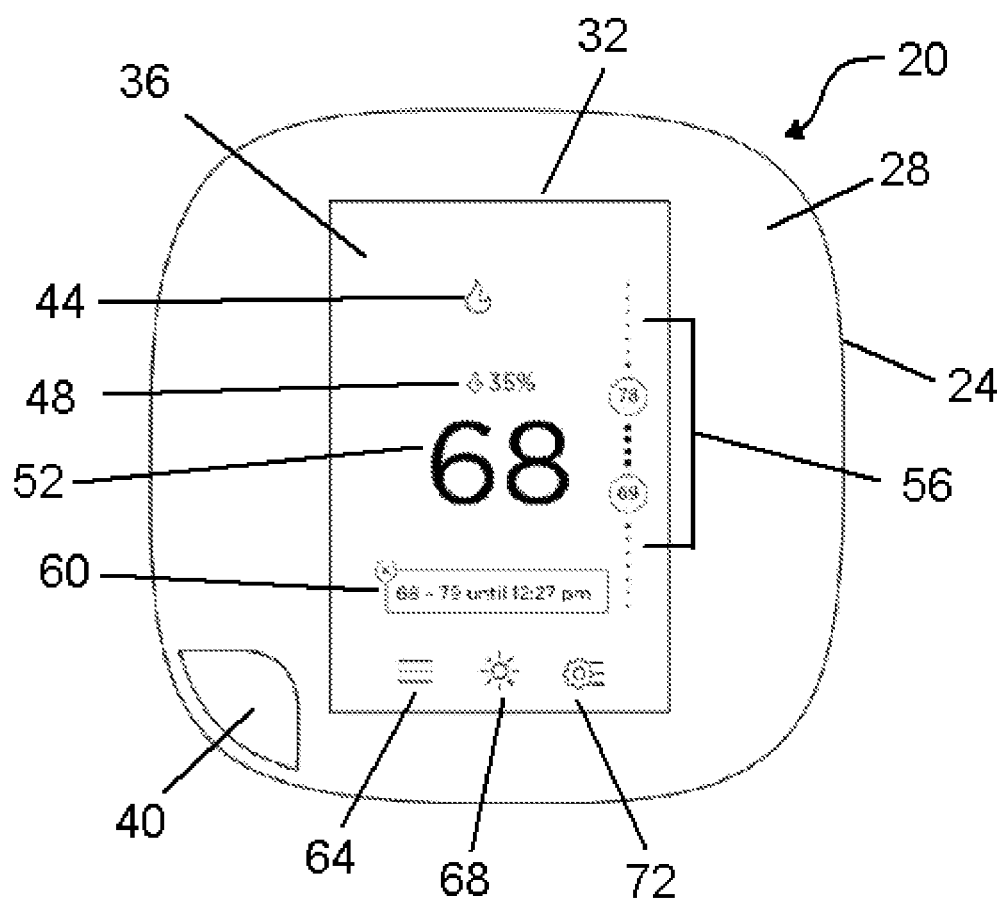
FIG. 1 is a schematic representation of a control device for an HVAC system.

A control device, in accordance with the present invention, is indicated generally at 20 in FIG. 1. Control device 20 comprises a housing 24 with a front face 28 that includes at least a portion 32 which is transparent and through which a touchscreen 36 can be viewed and interacted with. Front face 28 can also include a motion sensor 40, which can be used as an occupancy sensor, detecting a user's presence and/or proximity to control device 20. A printed circuit board (PCB) is located within housing 24 and much or all of the hardware of control device 20 is mounted on, or to, PCB which is discussed in more detail below.

Touchscreen 36 can display a wide variety of information, including operating messages, icons, controls and menus. For example, touchscreen 36 can display an icon 44 indicting a current operating mode (such as heating or cooling); measured values such as a humidity level 48 and a temperature 52; user interface elements such as an input slider 56 to permit the input of a desired parameter, such as temperature, or a desired range for the parameter; a message window 60, where relevant messages can be displayed to a user; and other user interface control icons 64, 68 and 72 which can call up additional menus (64), information such as outdoor weather (68) and additional settings menus (72).

As will be apparent to those of skill in the art, in addition to the examples described above, touchscreen 36 can be configured and employed in a wide variety of manners to provide relevant information to a user and/or to allow a user to interact with control device 20 in a wide variety of ways.

Figure 2:
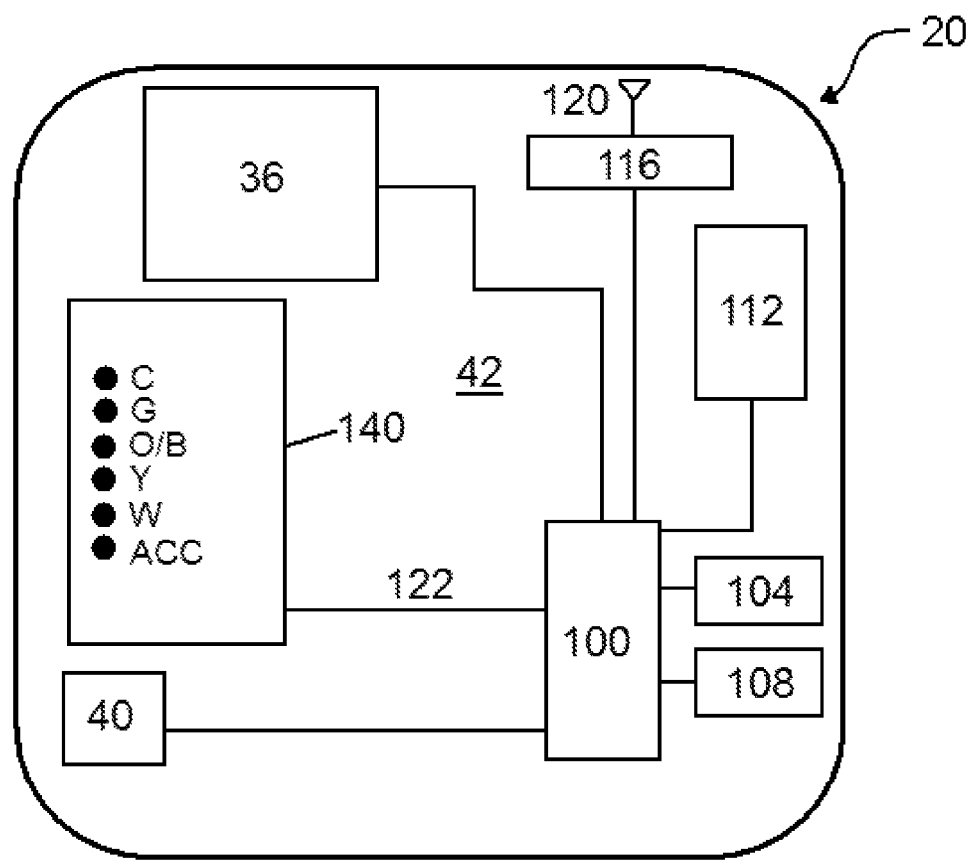
FIG. 2 is a block diagram of components of the control device of FIG. 1.

FIG. 2 shows a block diagram of the hardware of control device 20, much or all of which can be mounted on a PCB 42. Control device 20 includes at least one processor 100, which can be a microcontroller, a microprocessor or any other suitable device as will occur to those of skill in the art, non-volatile RAM 104 and volatile RAM 108. As will be apparent to those of skill in the art, neither, either or both of RAM 104 and RAM 108 can be integral with processor 100, or can be separate discrete devices or components, as desired.

Typically, non-volatile RAM 104 will store one or more programs for execution by processor 100, as well as various parameters relating to the execution of the programs and volatile RAM 108 will store data and working values required by the programs.

Touchscreen 36 is operatively connected to processor 100, as is motion sensor 40, and control device 20 further includes a real time clock, either as a service provided in processor 100, or as a separate component, not shown.

Control device 20 also includes at least one environmental sensor 112, which at a minimum is a temperature sensor but can also include other environmental sensors, such as a humidity sensor, which determine respective environmental conditions to be controlled and/or monitored. Typically, environmental sensors 112 in control device 20 will include at least both a temperature sensor and a humidity sensor.

A wireless communication module 116 is operatively connected to an antenna 120 and to processor 100 to allow processor 100 to communicate with communication networks such as the Internet and/or with additional external sensors (not shown) via at least one wireless communication protocol, such as WiFi; Bluetooth; ZigBee; ZWave; Cellular Data, etc.

It is specifically contemplated that wireless communication module 116 will allow at least one remote sensor, and preferably more than one, to determine and report the temperature and/or humidity at other locations within the controlled premises at which control device 20 is installed and, also preferably, the temperature of the environment external to those controlled premises.

Wireless communication module 116 also allows control device 20 to communicate with Internet based services (such as weather servers, remote monitoring systems, data logging servers, etc.) and with applications used remotely by users of control device 20 to monitor and control the controlled premises' environmental state.

As should now be apparent to those of skill in the art, control device 20 operates to execute its programming and to monitor a variety of environmental factors and other conditions and data and to compare those factors and conditions to a set of desired values, or ranges of values, which typically have been specified by a user of control device 20. When the monitored values vary from the desired values by more than a selected amount, control device 20 will operate the appropriate sub system(s) of the HVAC equipment of the premises to alter the respective environmental factor(s) to be closer to the desired value.

For example, if the temperature in the controlled premises is less than a user selected target temperature, control device 20 can activate a furnace (or other heating system) to raise the temperature and then deactivate that HVAC equipment when the target temperature is achieved. If the temperature in the controlled premises is higher than the target temperature, control device 20 can activate an air conditioner system (or a ventilation system, etc.) to lower the temperature, etc.

Control device 20 therefore further includes a relay assembly 140 to provide appropriate control signals to HVAC subsystems, or any other devices controlled by control device 20 and relay assembly 140 is operatively connected to processor 100 by a signal bus 122 such that processor 100 can change the state of the outputs (described in more detail below) of relay assembly 140. Relay assembly 140 is employed in control device 20 as at least some of the outputs at relay assembly 140 require greater levels of power, and/or different voltages, than the outputs of processor 100 can directly provide.

While for the purposes of illustration and clarity herein relay assembly 140 is shown in the Figures as single subsystem, it should be understood that relay assembly 140 is not so limited and, in fact, the functions of relay assembly 140 can be implemented via appropriate components mounted at various locations on PCB 42 and connected, as needed, by appropriate PCB traces.

Figure 3:
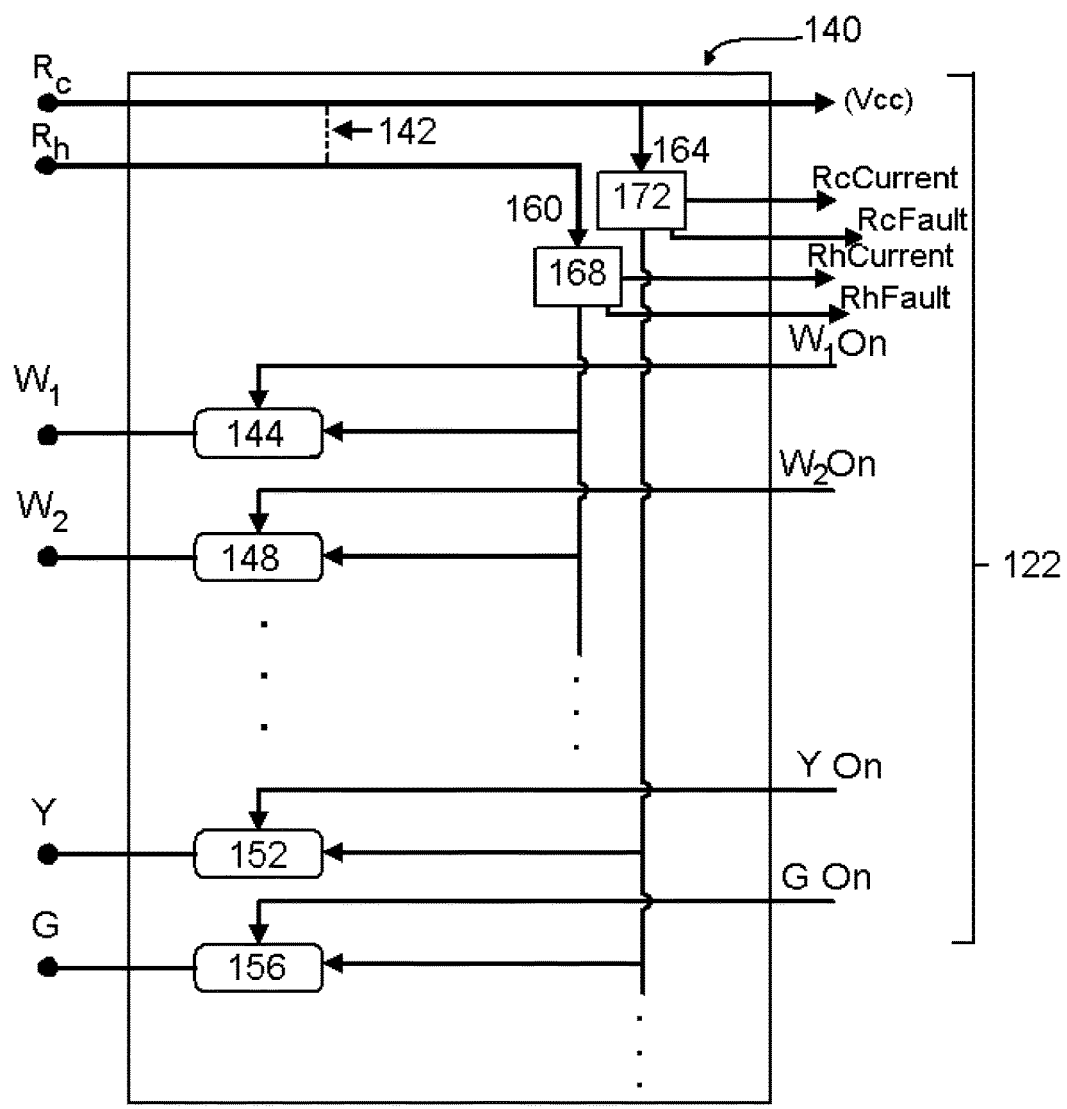
FIG. 3 is block diagram of a relay assembly of the control device of FIG. 1.

HVAC systems, if control device 20 is used to control the operation of such systems, typically include a variety of (often six or more) control signal lines and power supply lines. With respect to power supply lines, some HVAC systems have a single transformer outputting 24 VAC for both heating and cooling operations, while others have a separate heating transformer and cooling transformer, each of which output 24 VAC. In the latter case, a power line "Rh" is the "hot" side of the heating-related transformer of the HVAC system which connects to control device 20 and a powerline "Rc" is the "hot" side of the cooling-related transformer which connects to control device 20, as shown in FIG. 3.

In the former case of an HVAC system having a single transformer, in the present invention the hot side of that transformer can be internally jumpered, by optional jumper 142, to provide both the Rc and Rh power lines within control device 20. In many circumstances, either the Rc or Rh power supply lines can also be used to power control device 20, or a separate power supply can be employed, if desired. In FIG. 3, the Rc line serves to provide power to the rest of control device 20.

A common line (not shown) is connected between the other side(s) of the transformer (or transformers, if two or more are present) and control device 20 to complete the power supply circuit.

Typical control signal lines from control device 20 can include a "G" line, for controlling an air circulating fan, an "O/B" line for controlling a heat pump reversing valve; a "Y" line (or Y1 and Y2 lines) for controlling an A/C or heat pump compressor, a "W" line (or W1 and W2 lines) for controlling a furnace or auxiliary heater for a heat pump, and an "ACC" line for controlling accessories, such as dehumidifiers, humidifiers, ventilators, etc. In FIG. 2, five output terminals (G, O/B, Y, W, ACC) are shown on relay assembly 140, but different terminals and/or greater or fewer numbers of output terminals can be provided as desired.

While relay assembly 140 could employ electromechanical relays to energize, and de-energize, the respective terminals this is not preferred for a variety of reasons including: operating noise; power consumption and heat generation; reliability; size; and expense. Instead, in the illustrated embodiment relay assembly 140 employs solid state relays, such as FET-based relays, to provide, or remove, control signals to the terminals in response to control signals from processor 100.

One of the known factors that can affect the operation and accuracy of control device 20 is the self-heat produced by operation of control device 20. For example, processor 100, wireless communication module 116, the backlight of touchscreen 36 (which preferably is equipped with a backlighting system), and relay assembly 140 all produce waste heat (typically referred to as bulk heating) as an inevitable byproduct of their operation. This bulk heating occurs within housing 24 of controller 20 and thus environmental sensor 112 (which is also located within or on housing 24), will typically report a higher temperature than the ambient temperature in the environment outside housing 24, thus resulting in poor, or incorrect, temperature control by control device 20.

Accordingly, it is known to apply a compensation factor to the temperatures measured by internal sensors of control devices to remove the effects of bulk heating on those temperature measurements. One such compensation system is described in U.S. Pat. No. 9,016,593 to Metselaar, assigned to the assignee of the current invention.

In the Metselaar patent, compensation is performed by dynamically measuring both the current and voltage supplied to the Metselaar control device by its power supply to determine a nominal value for the power supplied to the control device and the controlled hardware (contactors, etc.). This determined nominal power supplied value is then used to select a corresponding temperature offset value from a predetermined table of such temperature offset values. These offset values have been predetermined to relate the power supplied to the control device with the bulk heating expected to correspondingly occur within the control device. The selected offset value is then subtracted from the temperature value obtained from a temperature sensor within the control device housing to compensate the measured temperature value for the bulk heating within the control device.

While these prior techniques, and particularly the Metselaar technique, have improved the operating accuracy of smart thermostats, they still produce a less accurate result than may otherwise be desired. For example, the actual power consumption of the controlled sub systems/hardware can vary significantly between installations thus affecting the underlying assumptions (and hence the accuracy) used to create the predetermined offset values.

Further, the differences in the actual bulk heating of a control device when operating in different modes and/or with different active and inactive outputs can vary significantly and thus merely measuring power supplied to the control device cannot provide for bulk heating temperature compensation with a desired level of accuracy.

In particular, as is well known to those of skill in the art, many devices such as a solid state relay (such as a FET-based relay) produce bulk heat proportional to the square of the current flowing through them. Thus, while values of bulk heat produced by the operation of some components of a control device (e.g. —touchscreen backlight) will change linearly and can be predetermined and stored for use in calculating a compensation factor, the amount of bulk heat produced within solid state relays by their components and the resistance of printed circuit board traces cannot easily be accurately predicted as it will change with respect to square (i.e. —non linearly) of the current flowing through each solid state relay and the associated circuit board traces, which is in turn dependent upon the load connected to the terminals controlled by the respective relays.

As mentioned above, in HVAC systems, typically the load connected to terminals of a control device can vary significantly between different installations. For example, in one HVAC system the load (a contactor) connected to the W1 terminal may draw 3.5 amps while in another HVAC system the load connected to the W1 terminal may only draw 1.5 amps. As will be apparent, the bulk heat produced by the solid state relay and circuit traces handling the 3.5 amp load is over five times greater than the bulk heat produced by the same solid state relay and circuit traces when handling the 1.5 amp load.

Thus, it has proven to be difficult to provide bulk heating temperature compensation of a desired level of accuracy in prior art control devices, such as smart thermostats and various assumptions and/or averages have been employed in making such compensatory calculations in the past for such systems, albeit with less than the best results.

In contrast, the present inventors have determined that by measuring the actual current being provided to relevant terminals of relay assembly 140 a variety of advantages can be achieved, including obtaining a more accurate determination of the bulk heat produced in control device 20, allowing for a more accurate bulk heating compensation of temperatures measured by environmental sensors 112.

Returning now to FIG. 3, relay assembly 140 is shown in more detail. Relay assembly 140 is connected to one or more ports of processor 100 via signal bus 122 and can have a variety of output terminals for connection to relevant HVAC devices. In the Figure, only the W1, W2, Y and G terminals have been shown for clarity, but it will be apparent to those of skill in the art that a variety of other terminals can be included as desired. Relay assembly 140 also includes at least one of an Rh and Rc power supply terminal, or equivalent, which supplies power (i.e. Vcc) to relay assembly 140 and thus to control device 20.

Each output terminal (W1, W2, Y, G) of relay assembly 140 is controlled by a respective switch 144, 148, 152 and 156, which in the present embodiment are FET-based solid state relays, that are controlled by processor 100. Each switch 144, 148, 152 and 156 has a respective activation signal (W1 On, W2 On, Y On and G On) which is part of signal bus 122.

Vcc is provided to the above-mentioned switches 144, 148, 152 and 156 via one of two power busses, specifically an Rh bus 160 and an Rc bus 164. Power supplied to Rh bus 160 flows through a current monitoring device 168 and, similarly, power supplied to Rc bus 164 flows through a current monitoring device 172.

While two power busses, each with a corresponding current monitoring device, are shown in FIG. 3, the present invention is not so limited and it is contemplated that in alternative implementations relay assembly 140 can include a single power bus and associated current monitoring device, or can employ three or more power busses with corresponding associated current monitoring devices, including an implementation with a separate power bus and associated current monitoring device for each output terminal, if desired.

It is also contemplated that relay assembly 140 can include, in addition to a power bus with an associated current monitoring device, one or more power busses which do not include associated current monitoring devices for cases wherein the power requirements for the outputs powered by those power busses are fixed, or otherwise known, and thus the current supplied to those outputs is predetermined or otherwise known.

Returning again to FIG. 3, as mentioned above, Rh bus 160 is connected to the Rh power supply terminal by current monitoring device 168, which can be any suitable device for monitoring current as will occur to those of skill in the art. In the illustrated embodiment, current monitoring device 168 provides an output voltage signal, RhCurrent, to processor 100 via signal bus 122 and the RhCurrent voltage signal is proportional to the current flowing through current monitoring device 168 to Rh power bus 160 and switches 144 and 148 connected thereto. Current monitoring device 168 also preferably, but not essentially, provides a fault logic signal RhFault (discussed below) to processor 100 via signal bus 122.

Similarly, Rc bus 164 is connected to the Rc terminal by current monitoring device 172, which is similar to current monitoring device 168, which provides an output voltage signal, RcCurrent, to processor 100 via signal bus 122 and the RcCurrent voltage signal is proportional to the current flowing through it to the Rc bus and switches 152 and 156 connected thereto. Current monitoring device 172 also preferably, but not essentially, provides a fault logic signal RcFault (discussed below) to microprocessor 100 via signal bus 122. In the illustrated embodiment, Rc also provides operating power (Vcc) to the rest of control device 20 and this power is supplied before current measuring device 172.

In operation processor 100 can, for example, cause the W1 terminal to be connected to the Rh terminal, and hence energized via Rh bus 160, by asserting the "W1 On" signal line, closing switch 144. Similarly, asserting the "G On" signal line will close switch 156, causing the G terminal to be connected to Rc bus 164.

By monitoring the currents measured by current monitoring devices 168 and 172, processor 100 can calculate the amount of current flowing through the respective power bus 160 and 164 to switches 144, 148, 152 and 156, etc. and can calculate a value for the bulk heat produced by the current flowing through the respective switches and corresponding PCB traces.

In a simple case, processor 100 can have predefined total resistance values associated with each switch 144, 148, 152 and 156, each predefined total resistance value being a sum of the respective PCB circuit trace resistances and the resistances across the respective switches.

In such a case, processor 100 first determines the amount of the total current flow, reported by the respective current monitoring device, which flows through each activated switch (as described further below). When the respective current flow through each activated switch is determined, processor 100 can calculate the bulk heating produced within relay assembly 140 by, for each activated switch, determining the product of the square of the current flow allocated to the activated switch times the predefined total resistance value for the respective activated switch and summing those determined values.

Once the bulk heating produced within relay assembly 140 is determined, this value is summed with the bulk heating produced in the remainder of control device 20 to obtain a determined sum of the bulk heating in the housing. This latter value is determined by determining the voltage and current provided to the rest of control device 20 (these values are determined by other current and voltage sensors, not shown) and the product of those determined values represents the bulk heating produced in control device 20, other than that produced in relay assembly 140. The determined sum of the bulk heating in the housing value is then used to select a compensation factor to be applied to the temperature measured and reported by environmental sensor 112 to obtain a compensated temperature value which represents the temperature of the environment surrounding control device 20 and which is used by control device 20 when it is employed to manage an environmental temperature and/or relative humidity.

Figure 4:
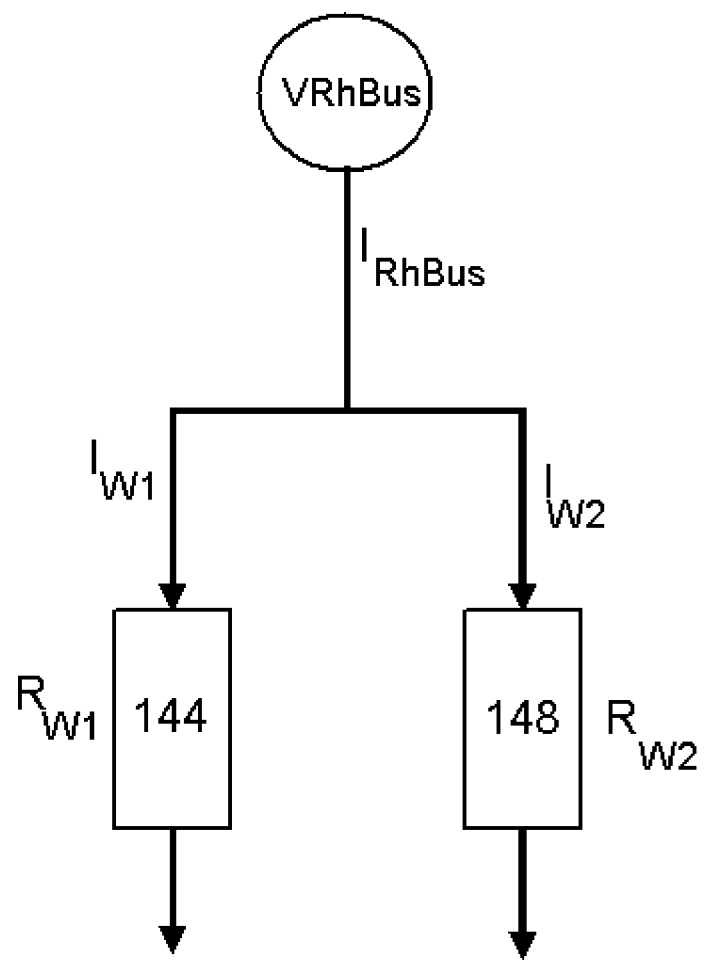
FIG. 4 is a schematic representation of current flows through outputs of the control device of FIG. 1.

Determining the allocation of the measured current flows through each bus to respective switches activated on the buses is achieved as follows. FIG. 4 shows a representation of the ideal current flow through bus 160, which in this example just includes two switches, 144 and 148. As can be seen, the total current flowing, IRhBus is the sum of the current (if any) flowing through switch 144 (i.e. $-I_{W1}$) and the current (if any) flowing through switch 148 (i.e. $-I_{W2}$). Thus, the bulk heating produced by bus 160 is, in an ideal case, equal to the square of the current through switch 144 ($I_{W1}^2$) times the total resistance of switch 144 and its associated PCB traces (collectively $R_{W1}$) plus the square of the current through switch 148 ($I_{W2}^2$) times the total resistance of switch 148 and its associated PCB traces (collectively $R_{W2}$). In this ideal case, if $I_{RhBus}$ is measured when only a single switch is activated, then the current flow through that switch is equal to $I_{RhBus}$ and can be measured and stored for subsequent use to determine the appropriate allocation of measured current $I_{RhBus}$ between respective switches when more than one switch is activated.

Thus, for example, if $I_{RhBus}$ is measured at 2 amps when only switch 144 is activated, current $I_{W1}$ is deemed to be 2 amps ($I_{W1}=I_{RhBus}$) and processor 100 will store this value for future use. When switch 148 is subsequently also activated and current $I_{RhBus}$ is measured by current monitoring device 168 at 3.5 amps, processor 100 retrieves the stored value for current $I_{W1}$ (i.e. -2 amps) and subtracts the stored value from the measured value to determine current $I_{W2}$ to be 1.5 amps and the above-described bulk heating calculations are then performed with these values.

However many, if not most, HVAC systems employ inexpensive transformers which have significant internal resistances (i.e. —copper losses, etc.) and their supplied voltages decrease as the power drawn from the transformer increases. Thus, to obtain a more accurate determination of the current flowing through each switch, in a preferred embodiment of the present invention this variability in the power supply voltage is also considered when determining current flows through each activated switch.

For example, the nominal value of the supply voltage (VRhBus) on the RhBus is 24 VAC. When switch 144 is activated and current flows through it to a load, $I_{W1}$ may be measured at 2 A and VRhBus may be measured (by a voltage sensor, not shown) at 23.5 VAC and these values are stored by processor 100. Preferably, this is a dynamic process and is repeated at regular intervals to quickly identify any changes in the operating conditions of the HVAC sub systems and/or the operation of control device 20. In a present embodiment of the invention, this process is repeated every 5 seconds.

If switch 148 is also activated and current flows through it to a load, IRhBus may now be measured at 3.5 A and VRhBus may now be measured at 22 VAC. From these values, and the previously determined values of VRhBus and $I_{W1}$ stored by processor 100, processor 100 can estimate that the new value of $I_{W1}$ under these conditions is $$2 \text{ A} \times \frac{22 \text{ V}}{23.5 \text{ V}} = 1.87 \text{ A}$$

and thus $I_{W2}$ is 3.5 A−1.87 A=1.62 A at VRhBus=22V and processor 100 stores these new values.

As will be apparent to those of skill in the art, if another switch X (not shown) is activated on the RhBus and IRhBus is measured at 5 A and VRhBus is measured at 20V, then, since processor 100 has stored values for of 1.87 A for $I_{W1}$ and 1.62 A for $I_{W2}$, both at VRhBus=22V, processor 100 can determine that $$I_{W1} = 1.87 \text{ A} \times \frac{20 \text{ V}}{22 \text{ V}} = 1.7 \text{ A}, I_{W2} = 1.62 \text{ A} \times \frac{20 \text{ V}}{22 \text{ V}} = 1.47 \text{ A}$$

and $I_X$=5 A−1.7 A−1.47 A=1.83 A at VRhBus=20V and processor 100 will store these values too.

A similar calculation is preformed when a switch is deactivated. In the example above, when switch 148 is deactivated, we knew from the previous determination that $I_{W2}$ was 1.47 A and VRhBus may now be measured at 23V. Thus, the system proceeds to scale the remaining current flows and determines that $$I_{W1} = 1.7 \text{ A} \times \frac{23 \text{ V}}{20 \text{ V}} = 1.955 \text{ A and } I_X = 1.83 \text{ A} \times \frac{23 \text{ V}}{20 \text{ V}} = 2.1045 \text{ A}.$$

As will be apparent to those of skill in the art, for a variety of reasons (i.e. —rounding errors, drift, etc.) the determined current values may not precise total the measured currents reported by current monitoring devices 168 and 172. Therefore, each time that current monitoring devices 168 and 172 report a measured current to processor 100, the difference between the total of the determined currents and the measured current on each power bus is added, proportionally, to the determined current through each respective switch. In other words, if switches 144 and 148 are active on RhBus 160 and $I_{W1}$ has been determined to be 1 A and $I_{W2}$ has been determined to be 2 A and yet the current reported by current monitoring device 168 is 3.1 A, then processor 100 adds $$\frac{2}{3.1} \times 0.1 \text{ A}$$

to the determined value for $I_{W2}$ to get $I_{W2}$=2.0645 A and adds $$\frac{1}{3.1} \times 0.1 \text{ A}$$

to the determined value for $I_{W1}$ to get $I_{W1}$=1.03225 A.

This adjustment of the determined currents is preferably performed at regular intervals (in a current implementation of controller 20, every 5 seconds) and each time a switch has been activated or deactivated on a respective bus.

As should now be apparent, by determining current flows through the solid state switches of relay assembly 140 and calculating the bulk heating produced within housing 24 thereby and combining that value with the determined value of the bulk heating produced elsewhere within housing 24, control device 20 can compensate temperature measurements made by environmental sensor 116 with a high degree of accuracy.

Another advantage of the present invention is the ability to provide improved over-current protection for the switches in relay assembly 140. Specifically, switches such as solid state relays 144, 148, 152 and 156 can be damaged by over-current events and solid state relays, such as those implemented with FETs, can be fatally damaged by even brief over-current events. Accordingly, processor 100 can monitor $I_{RhBus}$ and $I_{RcBus}$ and can deactivate corresponding switches in the case of a respective measured current exceeding a preselected maximum permitted current value. This can reduce the chance that switches 144, 148 152 and 156 would be damaged by events such as an electrical short circuit during an incorrect installation, or some other exceptional circumstance which leads to a temporary over current situation.

One of the challenges in implementing such an over current protection scheme is the fact that control device 20 is expected to function when connected to a wide variety of HVAC devices and sub systems. Often, such HVAC devices are controlled by contactors or other control devices which are inductive loads on the output terminals of relay assembly 140. As is well known, inductive loads often produce voltage spikes as their induced magnetic fields collapse when power is removed. It is not uncommon for such voltage spikes to reach, or exceed, 100 VAC in HVAC systems operating normally at a nominal 24 VAC.

Accordingly, control device 20 needs to be able to reliably distinguish between an unexpected fault condition which can result in damage to a switch and/or connected equipment and a normal operating condition (transient) over-current event which can be tolerated. Upon detecting a fault condition, control device 20 will then deactivate an affected switch sufficiently quickly to prevent damage being inflicted upon the switch and connected equipment.

Desirably, any protection system should operate to: deactivate a switch experiencing an over-current condition before any damage occurs to the switch or connected equipment; deactivate a switch if the steady state current through the switch exceeds a predefined threshold; allow a switch experiencing a transient overload condition that will not damage the switch or connected equipment to remain active; and allow a switch experiencing repeated, but sufficiently infrequent, overload current transients to remain active.

As damage to FETs occurs when the FETs must dissipate too much power over too long a period of time, raising the operating temperature of the FET junctions to a level at which the junction is damaged, both the amount of power dissipated and the time the FET is dissipating that power must both be considered.

The present inventors have determined that it is not practical to address all of the desired protection scenarios with a single fixed threshold for detecting over current events. Instead, the present inventors have established a set of thresholds that are triggered as described below.

First, the present inventors examine the specific characteristics of the FETs employed in switches 144, 148, 152 and 156 to determine the maximum power levels that the FETs can dissipate, in a given time, without causing the FET to exceed the operating temperature at which they will be damaged. Such information is typically available from the data sheets provided by the manufacturer of the FET or can be determined empirically, etc.

In control device 20, the current flowing through each bus, as determined by respective current monitoring devices 168 and 172 are reported to processor 100 at regular intervals and in a present implementation these are reported every 1 ms. It is assumed that, if the current through a respective bus exceeds a predefined threshold, as described below, all activated switches on that bus should be deactivated to ensure that no damage occurs to the switches or attached equipment. As will be apparent to those of skill in the art, this is a conservative protection strategy as it is possible that, in a case where two or more switches are activated on a bus determined to be in an over current condition, only one switch might be supplying the excess current and thus be susceptible to damage, but the present inventors have adopted the conservative strategy of deactivating all active switches on a bus as this requires less processing and thus can be implemented more quickly. As will be apparent, if additional computing resources are available or if expected failure modes are much different, a strategy of deactivating only the switch supplying the excess current can be employed instead.

In a specific example, it was determined that the FETs in the switches (144, 148, 152, 156, etc) at an expected nominal operating temperature, could tolerate a peak current of: 15.6 amps for ½ an AC sine wave (cycle); 13.36 amps for a full AC sine wave (cycle); 12.2 amps for two full AC sine waves, 11.2 A for four full AC sine waves; and 9.96 amps for eight full AC sine waves, based on a 60 Hz AC cycle time.

From this information, the inventors determined a five layer set of safety thresholds for a maximum measured bus current ($I_{peak}$):

(1) if $I_{peak}$ for a bus exceeds 12.5 amps then the respective bus switches are deactivated immediately;

(2) if $I_{peak}$ for a bus is less than 12.5 amps but greater than 12 amps for one full AC cycle, then the respective bus switches are deactivated;

(3) if $I_{peak}$ for a bus is less than 12 amps but greater than 11 amps for more than two full AC cycles, then the the respective bus switches are deactivated;

(4) if $I_{peak}$ for a bus is less than 11 amps but more than 10 amps for more than four full AC cycles, then the respective bus switches are deactivated;

(5) if $I_{peak}$ for a bus is less than 10 amps but greater than 3.5 amps for more than seven complete AC cycles, then the respective bus switches are deactivated; and (6) $I_{peak}$ for a bus between 0 amps and 3.5 amps is considered the nominal operating condition.

In the case where a lower safety threshold value is exceeded for less than the maximum permitted number of cycles before $I_{peak}$ increases to a higher safety threshold value, the count of the number of cycles during which the lower safety threshold value was exceeded will be added to the count of cycles experienced at the higher safety threshold. For example, if $I_{peak}$ is 5 amps for two cycles (of the seven permitted by threshold (5)) and then $I_{peak}$ increases to 10.5 amps, threshold (4) is considered to be triggered if $I_{peak}$ remains over 10 amps for just two additional cycles (for the total of four AC cycles defined for threshold (4)).

Further, anytime a safety threshold value is exceeded, but a safety threshold is not triggered, i.e. —$I_{peak}$ is 10.5 amps for one cycle, $I_{peak}$ must go below the nominal value (i.e. -3.5 amps in this example) for a predefined number of AC cycles (in the current implementation a total of 7 cycles) to allow the semiconductor junctions in the FETs to cool down to safer levels.

As will be apparent, the actual values utilized in the safety thresholds will differ based upon the specific FETs employed in switches 144, 148, 152 and 156, the expected ambient temperature at which control device 20 will operate, the AC frequency (60 Hz vs 50 Hz), etc. and it is within the normal ambit of those skilled in the art of semiconductor device circuit design to be able to determine the maximum power dissipation levels for a specific set of FETs and/or a specific set of expected operating conditions to produce suitable values for the set of safety thresholds.

Further, depending upon the expected operating conditions, it is contemplated that a fewer or greater number of safety thresholds can be defined within the set as desired.

In operation, processor 100 monitors the current flowing through each bus (RhBus 160 and RcBus 168) and will compare the monitored maximum current values (and the number of AC cycles that they have been at a level of interest) to the predefined set of safety thresholds. When the current through a switch exceeds a safety threshold, processor 100 will deactivate the activated switches on the respective switch to prevent the FETs in the switches on that bus from becoming over heated and thus damaged.

As an additional safeguard, each of current monitoring devices 172 and 176 preferably have, respectively, a logic output $Rc_{fault}$ and $Rh_{fault}$ which are active when the current passing through the respective current monitoring device is sufficiently high to saturate the sensor in the device. In a preferred embodiment, processor 100 treats $Rc_{fault}$ and/or $Rh_{fault}$ as an interrupt which is served by processor 100 and the interrupt service routine can immediately begin to deactivate all the switches in relay assembly 140 which are connected to the respective Rh bus 160 or Rc bus 164 whose corresponding current monitoring device (160, 164 reported the fault. After the respective switches have been deactivated, processor 100 can attempt to reactivate the switches in a safe manner.

By handling $R_{cfault}$ and $R_{hfault}$ as an interrupt, rather than as an analog input signal that must be digitized by an A/D converter (which is provided as a component of processor 100, or as a separate component) processor 100 can shut down the relevant switches much more quickly than would be the case if a sample and hold cycle of an A/D converter had to be performed. Thus, in the case of a severe over current event, shut down can be achieved at a very quick rate.

When it is desired to deactivate a switch due to a fault or other undesired condition, it is desired that the shutdown of the switch occur quickly. As is well known, when the gate voltage to a FET is removed, to shut down the FET, the FET changes from a saturated mode of operation, through a linear mode of operation and then to off. Due to the resistance characteristics of FETs, a significant amount of power is dissipated while they are in the linear mode and it is thus important that, in an over current condition, the FET is transitioned through the linear mode region as quickly as possible.

Figure 5:
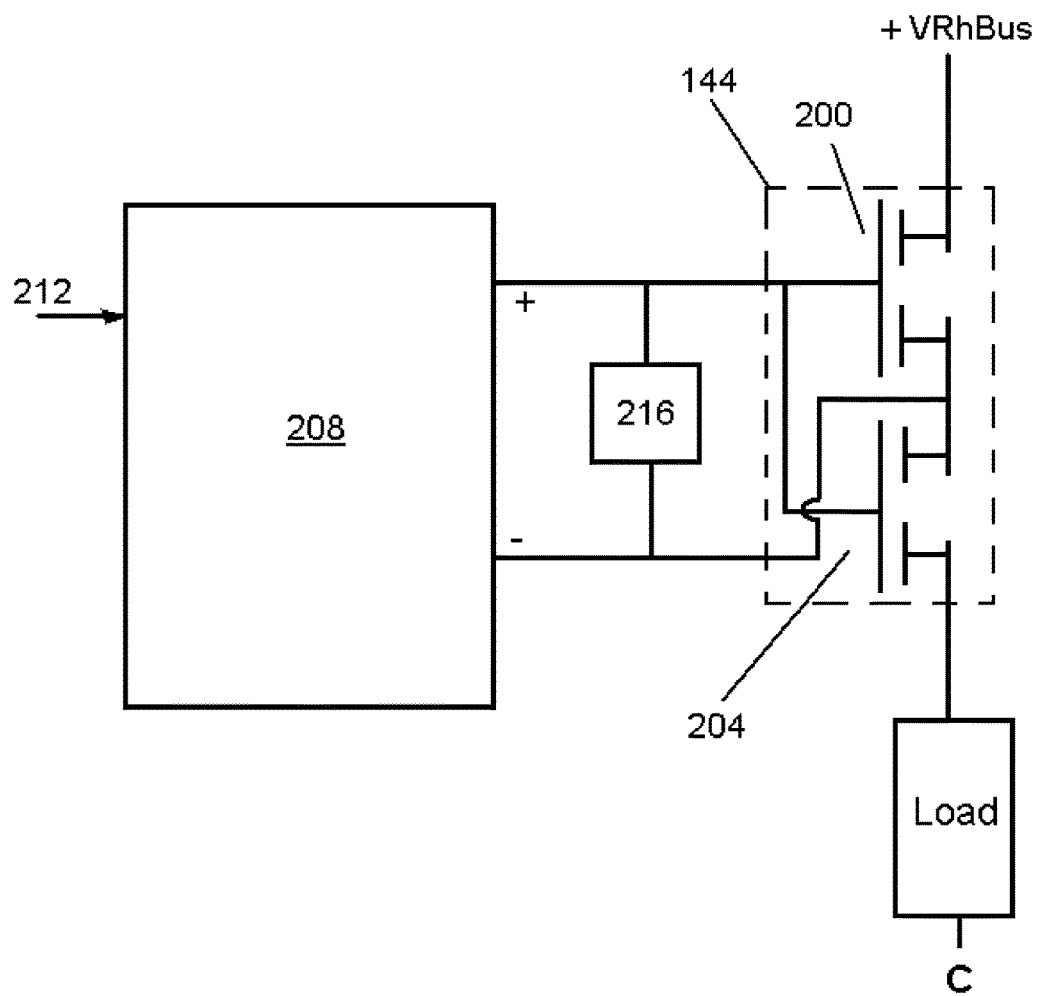
FIG. 5 is a schematic representation of the power supply, shut down circuitry and FETs of a solid state relay used in control device 20.

FIG. 5 shows a schematic representation of switch 144 of control device 20. As shown, switch 144 comprises two FETs 200 and 204 which are connected between VRhBus and a load. In controller 20, the voltage used to power processor 100, and other digital components, is 3.3V while the voltage required to activate the gates of FETs 200 and 204 is 10V.

Accordingly, controller 20 employs a charge pump circuit 208 to power the gates of each switch. Charge pump circuit 208 receives a PWM voltage 212 from processor 100 and, depending upon the duty cycle of the PWM voltage 212, provides a voltage between 0 and an appropriately selected maximum voltage to the gates of switch 144. As will be apparent to those of skill in the art, PWM voltage 212 corresponds to the $W_{1ON}$ logic signal used to activate switch 144 via signal bus 122, with a zero duty cycle corresponding to switch 144 being deactivated and an appropriate selected duty cycle (e.g. ~80%) corresponding to an appropriate voltage to activate switch 144.

While charge pump circuit 208, and the corresponding charge pump circuits associated with each other switch in relay assembly 140, provide the necessary control of the gate voltages of the corresponding FETs, they suffer from a disadvantage in that, when it is desired to deactivate switch 144, the capacitors employed as part of charge pump circuit 208 and the capacitance of PCB traces connecting them and other components of charge pump circuit 208 prevent the output of charge pump circuit 208 from moving to a zero voltage fast enough to move the connected FETs through their linear region of operation as quickly as is desired.

Accordingly, charge pump circuit 208 is further equipped with a rapid shut down circuit 216 which operates such that when the output voltage of charge pump 208 falls below a threshold value, slightly below the normal "on" voltage applied to activated gates of FETs 200 and 204, rapid shut down circuit will function to connect the positive output of charge pump circuit 208 to the negative output, thus quickly dissipating any remaining charge in charge pump circuit 208 and the respective FET gates and bringing the voltage output to zero and thus rapidly moving FETs 200 and 204 through their linear operating region to their off condition.

Each switch in relay assembly 140 comprising a FET based switch is similarly equipped with an equivalent charge pump circuit and rapid shut down circuit such that processor 100 can shut down a respective switch in relay assembly 140, when one or more of the predefined thresholds discussed above is exceeded and that shut down will occur sufficiently quickly so as to prevent damage to the respective FETs.

As should now be apparent, the present invention provides a novel control device, such as a smart thermostat, which employs solid state relays as switches to activate and deactivate systems controlled by the device, such as HVAC fans, compressors, etc. Current flows through the solid state relays to at least some of the controlled systems are monitored to determine the bulk heat produced in the solid state relays and their associated circuitry and printed circuit board traces and this determined amount of bulk heat is used, along with other determined bulk heating values, to compensate the reading provided by temperature sensors within the control device which have been affected by the bulk heat.

Further, by measuring the current flow to each power bus in controller 20, potentially damaging over current conditions can be distinguished from permissible transient over-current conditions and the control device can deactivate any solid state relays which would be damaged while allowing solid state relays which are experiencing allowable transients to remain operating. In the case of a severe over current condition, a current monitoring device can issue a fault signal, triggering an interrupt condition which will cause a processor in the controller to shut down the affected solid state relays very quickly.

The above-described embodiments of the invention are intended to be examples of the present invention and alterations and modifications may be effected thereto, by those of skill in the art, without departing from the scope of the invention which is defined solely by the claims appended hereto.

We claim:

1. A control device for controlling one or more electrical subsystems in accordance with a control program, comprising:

a housing;

a memory storing an operating program;

at least one environmental sensor within the housing to determine the temperature within the housing;

at least two solid state relays, each of the at least two solid state relays operable, when activated, to connect respective electrical subsystem to a supply of power and further operable, when deactivated, to disconnect the respective electrical subsystem from the supply of power, each of the at least two solid state relays having a predetermined respective electrical resistance;

at least one current measuring device to determine the total amount of current flowing from the supply of power to each respective electrical subsystem when the respective solid state relay is activated; and a processor operable to execute the operating program to:
- determine the proportion of the determined total amount of current flowing through each of the at least two solid state relays;
- determine the amount of bulk heating produced by the determined proportion of the total current and the respective predetermined electrical resistance to obtain a determined amount of bulk heating;
- sum the determined amount of bulk heating with the amount of bulk heating produced in the housing by other components to obtain a determined sum of the bulk heating in the housing; and
- compensate the determined temperature value by an amount corresponding to the determined sum of the bulk heating in the housing to obtain a compensated determined temperature value.

2. The control device of claim 1 wherein each of the respective electrical subsystems are part of an HVAC subsystem.

3. The control device of claim 2 wherein each respective solid state relay comprises: a pair of FETs; a charge pump to deliver a control voltage to the gates of the FETS from the processor; and a fast shutdown circuit, operable to connect the output of the charge pump to ground when the fast shutdown circuit detects that the control voltage is less than a predefined value.

4. The control device of claim 1 wherein the processor monitors the value of the determined total amount of current reported by the at least one current measuring device and compares that value to a predefined set of threshold values comprising a current value and a permitted time value, and the processor deactivates the at least two solid state relays if a threshold value is exceeded for more than the corresponding permitted time value.

5. A method of controlling, with a control device, a HVAC system comprising at least two electrical subsystems:
- measuring, with a temperature sensor located within a housing of the control device, a measured temperature;
- determining the sum of the bulk heating created by components and power flows within the housing, comprising the steps of:
  - measuring the total current flowing through at least two solid state relays to respective electrical subsystems, each of the respective electrical subsystems having a predetermined respective electrical resistance;
  - determining the proportion of the total current flowing through each of the at least two solid state relays,
  - determining the amount of bulk heating produced by the determined proportions of the total current and the respective predetermined electrical resistances to obtain a determined amount of bulk heating;
  - determining a bulk heating value corresponding to bulk heating created by other components within the housing; and
  - summing all determined bulk heating values to obtain a total bulk heating value; and
- compensating the measured temperature to correct for the determined total bulk heating value to obtain a compensated temperature value.

6. The method of claim 5 wherein each respective solid state relay comprises: a pair of FETs; a charge pump to deliver a control voltage to the gates of the FETS from the processor; and a fast shutdown circuit, operable to connect the output of the charge pump to ground when the fast shutdown circuit detects that the control voltage is less than a predefined value.

7. The method of claim 5 wherein the processor monitors the value of the determined total amount of current reported by the at least one current measuring device and compares that value to a predefined set of threshold values comprising a current value and a permitted time value, and the processor deactivates the at least two solid state relays if a threshold value is exceeded for more than the corresponding permitted time value.

* * * * *